March 1, 1932. W. SHURTLEFF Re. 18,374

HEATING AND VENTILATING UNIT

Original Filed Jan. 22, 1923 2 Sheets-Sheet 1

Inventor:
Wilfred Shurtleff
by George O. Haight
Atty

March 1, 1932. W. SHURTLEFF Re. 18,374

HEATING AND VENTILATING UNIT

Original Filed Jan. 22, 1923 2 Sheets-Sheet 2

Inventor:
Wilfred Shurtleff
By George P. Haight
Atty

Reissued Mar. 1, 1932 Re. 18,374

UNITED STATES PATENT OFFICE

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS

HEATING AND VENTILATING UNIT

Original No. 1,744,511, dated January 21, 1930, Serial No. 614,070, filed January 22, 1923. Application for reissue filed January 15, 1931. Serial No. 509,042.

This invention relates to heating and ventilating units, and more particularly to heating and ventilating apparatus comprising a unit adapted to be installed in a room to be heated, and in conjunction with an air opening to the outside atmosphere through which fresh air is drawn into the unit and discharged therefrom after passing through a compartment containing a heating element.

The primary object of the invention is to provide a heating and ventilating unit of the character described embodying an improved construction calculated to materially increase the efficiency of the device as a heating unit, to substantially decrease the size and weight of the unit, thereby reducing the space occupied and otherwise eliminating numerous objectionable features, such as transportation and installation difficulties.

A further object of the invention is to provide in a heating and ventilating unit a structure in which the housing and heating elements form a unit, and hence may be shipped and installed in completely assembled form, and by reason of its lightness may be mounted upon the wall and hence clear the floor.

The novel features herein mentioned are principally the result of the utilization of a highly efficient type of heating element or radiator, heretofore limited in its use to the field of automobile cooling systems, but readily adaptable to heating purposes as an element of the type of heating apparatus herein disclosed.

The type of radiator contemplated is of the so-called cellular, tubular, or honey-comb structure, as they are variously termed, depending on the structure. This type of radiator, regardless of its name, is characterized chiefly by its extreme lightness in weight in proportion to the radiator area, copper being the most satisfactory material used, either in the form of thin tubes or sheets, so assembled or fabricated as to provide a multiude of transverse air ducts, surrounded by passages through which the steam or heating fluid is circulated. While the particular type of radiator is not essential, the so-called cellular or honey-comb type affords a desirable structure, due principally to the small resistance offered to the passage of air therethrough and the extensive radiator area available.

Heretofore the usual type of heating element employed in heating units has been the cast iron radiator, which by reason of its weight and size has limited to a great extent the adaptability of the units. In the first place, it has been the practice to support radiators upon the floor, thus limiting at once the location of the unit. Again, the size of the radiator required to obtain the necessary heating surface necessitated a correspondingly large casing or cabinet, which occupied considerable space in the room and aisles, and therefore objectionable for that reason. Moreover, from the standpoint of manufacture, transportation, and installation, the cast iron radiator could not be made a part of the unit, but had to be shipped and installed separately, often requiring two classes of labor to completely install the apparatus.

One material objection to the cast iron radiator has been in the designing and installation of heating units in new buildings because of the discrepancy between the actual height of the fresh air duct above the floor level and that specified in the plans, thus making it difficult to install the heating equipment in the finished building. Therefore, by the designing of an improved structure incorporating the light cellular radiator, the objections and disadvantages above enumerated may be eliminated, as well as other advantages secured, as will be brought out in the following description of a preferred embodiment of the invention disclosed in the accompanying drawings, in which,—

Figure 1:
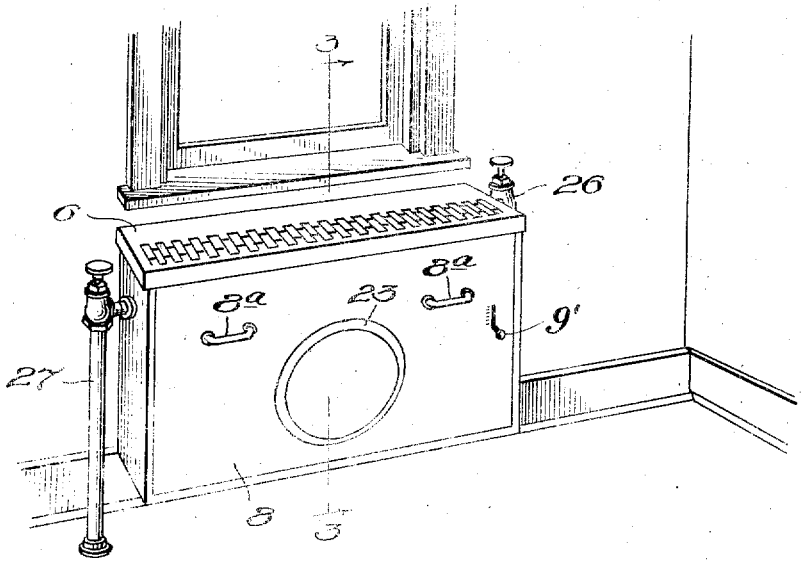
Figure 1 is a view showing a heating unit installed in a room.

In general, the unit embodies a housing or cabinet 1 adapted to be secured against the outside wall 2 of a room and having an air inlet passage or duct $2^a$ near its bottom opening through the wall and communicating with the outside atmosphere. Within the cabinet is formed a compartment in which is mounted a suction fan 3 directly in front of the intake opening $2^a$ to the cabinet, and a motor 4 directly connected to the fan.

In the upper portion of the cabinet is a vertically arranged heating element or radiator 5 of the so-called cellular type. In the top wall 6 of the cabinet is an air outlet or discharge opening 7 preferably covered by a grating and located between the radiator and the front wall 8 of the cabinet. A damper 9 is mounted in the passage formed between the radiator and the front wall, and serves to control the ratio of heated and unheated air discharged into the room.

The cabinet 1 is preferably fabricated of sheet metal and forms a unitary closure capable of supporting the radiator, and being supported by the building wall. The dimensions of the cabinet are variable, depending on the size and capacity of the unit, although in general shape it is somewhat elongated horizontally and relatively shallow in depth, this latter feature being of special importance inasmuch as this determines the distance which the cabinet projects into the room. The height of the cabinet is such as to extend between the window sill $2^b$ and the lower edge of the air intake opening $2^a$, the bottom of the unit being elevated well above the floor with a clear space below. However, the location of the unit need not be confined to any particular place in the room, although the arrangement suggested is a convenient one.

The air duct $2^a$ is preferably a rectangular opening through the building wall, having its outer opening covered by a grille 10 with a series of louvers 11 just inside of the grille for controlling the volume of air to be admitted as well as protection against a driving rain or snow.

The inner surface of the duct is preferably lined with metal, this being in the form of a sleeve 12, either forming a part of the cabinet and adapted to be inserted into the duct as a means for giving added support to the unit, or as a separate sleeve to which the cabinet may be attached, through the medium of a telescoping flange or in some other suitable manner. If necessary, the upper portion of the cabinet may be fastened to the wall by brackets, or in one of a number of ways. The main fastening for the cabinet, however, is combined with an independent support for the motor and fan, which will now be described.

The motor 4, which is of the usual type used for the purpose, is located opposite the opening to the air duct and in the forward portion of the cabinet, the fan 3 being mounted on the motor shaft immediately in front of said opening. Surrounding the motor casing is a bracket or cradle made up of two semi-circular straps 13, 13, bolted together at their ends. Strips of pliable material 14, 14, such as felt, are preferably inserted between the motor casing and the cradle as a means of absorbing the motor vibrations, and hence deadening the sound of the motor and fan.

Fixed to the straps forming the motor support are four arms 15 extending radially in the form of a spider, these arms being carried radially outwardly a distance sufficient to clear the fan, and thence laterally toward the opening in the rear of the wall of the casing, where they are supported in a rectangular metal frame 16 fitting into the entrance to said opening and having ears $16^a$ through which the arms extend.

The end portions of the arms 15 extend through the air duct in close proximity to the top and bottom surface, the outer extremities being anchored in a flanged frame 17 fitting in the outer end of the air duct, there being nuts applied to the ends of said arms which may be tightened, thus drawing all parts of the unit tightly against the wall and holding it firmly in place.

It is to be observed, however, that the motor and fan are supported by the building wall quite independently of the cabinet. This arrangement eliminates the transmission of any motor vibrations to the cabinet, and hence the noise that would otherwise result.

As a desirable type of fan for the purpose, one which delivers a large volume of air at a relatively low speed and with little noise is to be preferred. As an example of such a fan, a cone type fan is disclosed, so called from the conical shaped hub directed toward the source of the air supply. A further characteristic of the cone fan is its comparative large diameter, and particular blade arrangement, whereby the air is delivered at the periphery. A further advantage of this type of fan is its comparatively reduced depth or transverse dimension, which permits it to be housed in the cabinet of reduced depth.

To secure a still more compact motor and fan assembly, the conical hub $3^a$ of the fan is recessed or countersunk on the motor side, thus permitting the fan to be set closer to the motor, the shaft 19 of the latter extending into said conical depression and keyed beyond. A further advantage of this arrangement is to position the plane of rotation of the fan more nearly in vertical alinement with the shaft bearing, thus tending to dampen the motor vibrations, and promote a smoother running balance.

The motor is of the usual standard construction and therefore need not be described in detail. However, the matter of lubrication requires especial attention, owing to the inaccessibility of the inner bearing adjacent to the fan, as in most motors the armature shaft is journalled in bearings 20, 20, at either end of the motor casing, and which include an oil reservoir and an oil ring, the latter running on the shaft and partially submerged in the oil. A U-shaped oil pipe 21 is connected between the bearings, and with the periodic filling of the outer bearing reservoir through the usual filling opening 22, the level of the oil in both reservoirs is maintained constant and an adequate oil supply to the inner bearing is assured. Access to the motor as well as to the interior of the cabinet is obtained by arranging the front wall 8 so that it may be removed, a suitable arrangement of flanges being provided in the construction of the cabinet so that said front wall may be easily lifted out and replaced by the handle 8[a]. Owing to the projection of the outer motor bearing beyond the plane of the front wall 8, a circular enlargement 23 is formed so as to provide sufficient clearance.

Referring now in detail to the radiator 5, the same has already been described as to its general structure and location within the cabinet. The radiator consists of a cellular body 24 of copper sheeting so fabricated as to provide a multitude of small transverse passages or flues extending therethrough and separated by thin double wall partitions forming the passages for the steam. Along the top and bottom of the cellular structure and forming an integral part of the radiator are headers 25, 25, respectively, the top header being connected with the steam supply pipe 26 and the lower header with the return pipe 27.

Figure 2:
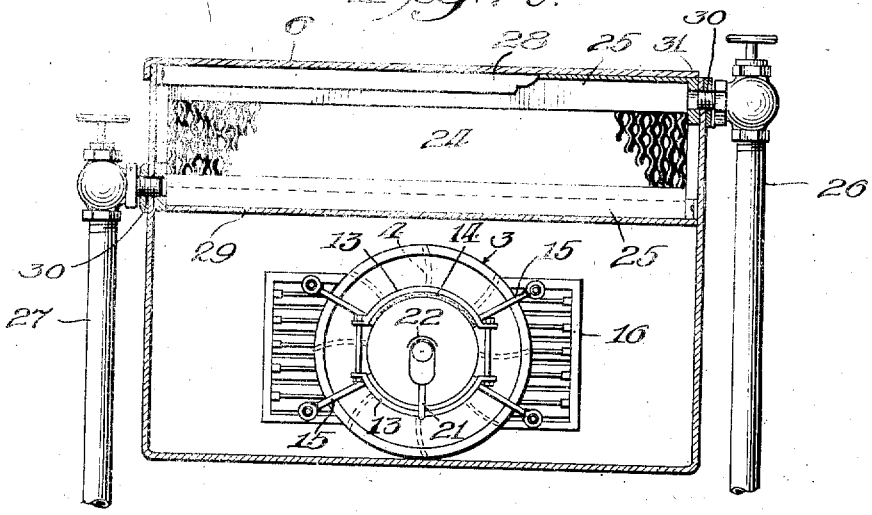
Fig. 2 is a view in vertical section through the unit, as taken on line 2—2 of Fig. 3.
Figure 3:
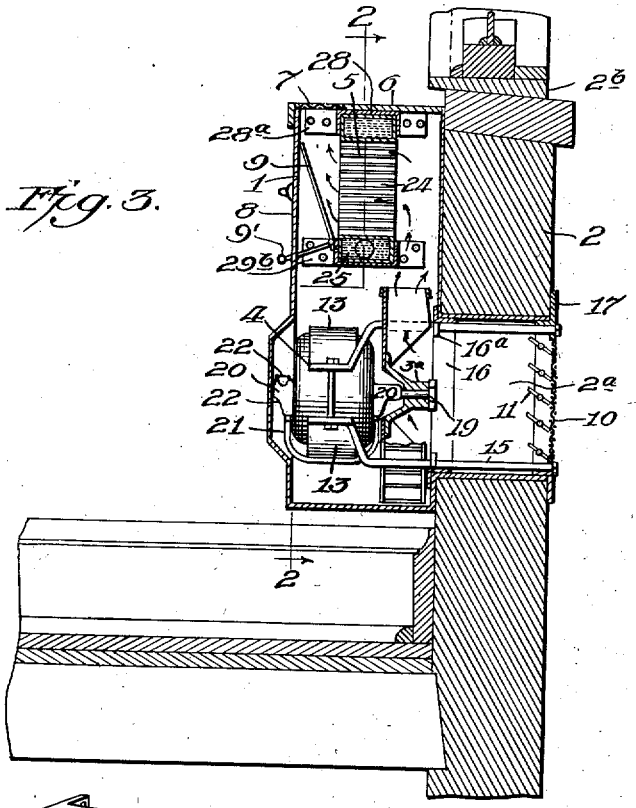
Fig. 3 is a view in vertical section of the unit as taken on line 3—3 of Fig. 1.
Figure 4:
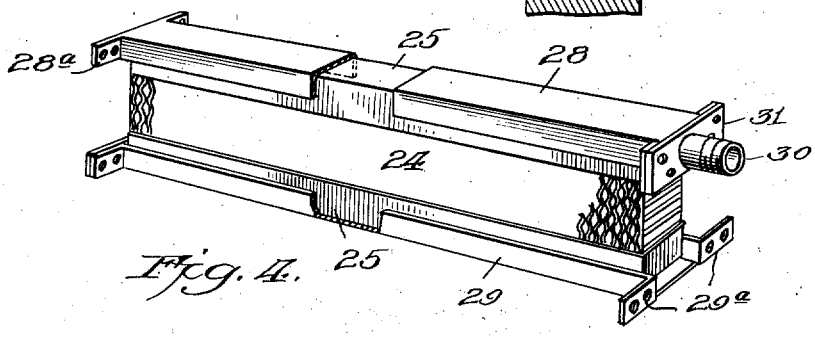
Fig. 4 is a perspective view of the radiator removed from the cabinet.

As clearly shown in Fig. 2, the radiator extends vertically downward from the top wall of the cabinet substantially midway between the front and back walls, its lower edge being well above the fan and motor. In length it extends from end to end of the cabinet and is supported thereby in the following manner:

Above and below the radiator and engaging the headers are channel-members 28 and 29 secured rigidly to the cabinet at their ends by means of rivets passing through ears 28[a] and 29[a] formed at the ends of said channel members, respectively. Thus the radiator rests upon the lower channel member and is anchored against displacement by the upper channel member.

As a preferable method of connecting the steam pipes to the radiator, threaded connections 30, 30 are provided at opposite ends and project laterally therefrom, the inlet connection being at the right end of the upper header and the return connection at the left end of the lower header (Fig. 2). The steam supply and return pipes 26 and 27 lead up to the points of connection in the usual manner, and the screw threaded connections of the radiator.

In order to protect the comparatively fragile radiator from strains and stresses due to the contraction and elongation of the pipes leading to and from the radiator, it is preferred to insert the radiator connections 30, 30 through apertured blocks or plates 31, 31, which are firmly riveted to the end walls of the cabinet. Thus any movement due to the elongation in the piping is transferred to the cabinet instead of being transmitted to the radiator, with the attendant possibility of the same being ruptured by the continual stresses to which it would be subjected.

As heretofore explained, the discharge opening 7 of the cabinet is located in the top wall 6 thereof, being a comparatively narrow grated opening or slot, extending the full length of and confined to the portion of the wall immediately above the vertical passage between the front face of the radiator and the front wall 8 of the cabinet. Hinged to the upstanding flange of the lower channel member 29 is the swinging damper 9 extending in a general upward direction. The transverse dimension of the damper is such that in closed position it lies flat against the exposed front face of the radiator, and substantially in the plane of the forward flanges of the supporting channel members, thus completely closing the discharge ends of the transverse air passages through said radiator. The damper is further capable of being adjusted by suitable regulating means, to be positioned obliquely across the passage, thus closing it entirely, or in any one of several intermediate positions of partial closing. In such intermediate position, the damper performs the function of regulating the volume of air passing indirectly through the radiator, and directly through the passage, which is in reality a by-pass duct around the radiator.

From the foregoing description, the action of the units and its regulating is quite manifest, although a further description may be desirable. The motor driven fan obviously draws a predetermined volume of air into the cabinet, thus creating a static pressure therein, after the manner of a plenum chamber. The air thus escapes to the discharge opening either by passing transversely through the radiator or directly through the vertical passage, depending upon the position of the damper. If the damper is fully open, thus shutting off the vertical passage, the entire volume of air passes through the radiator and thus is discharged at maximum temperature. If the damper is partially opened, a part of the air passes through the radiator and the remainder directly through the passage, and the mixing of the two currents of air at the discharge opening produces a more moderately tempered flow of air into the room.

Finally, the full closing of the damper shuts off the path through the radiator and the entire volume of air is discharged through the passage at substantially the temperature of the outside atmosphere, except for a tempering effect of the heat absorbed from the walls of the cabinet and parts in contact with the radiator. Manifestly, the adjustment of the damper and the resulting temperature of the air discharged is governed by weather conditions and the desired temperautre to be maintained in the room. The mounting of the damper so that it may be thrown up against the face of the radiator, and completely closing it off from the vertical passage, is a desirable feature, in that it reduces the radiation of heat from the radiator and hence the rate of steam consumption therein.

From the foregoing description, the advantages secured by the structure disclosed may be readily appreciated. The material reduction in size and weight of the radiator makes possible the advent of a more efficient heating apparatus of greatly reduced cubic content, thus increasing greatly the field of use for heating and ventilating systems of this character, as well as eliminating the many difficulties that attend the installation of the apparatus. By providing a light, self-contained radiator, the entire device may be secured to the wall, thus affording greater latitude in the location of the air ducts and avoiding the necessity of considering floor levels and height and arrangement of windows.

I claim:

1. In a heating and ventilating unit, the combination of a portable housing having an air inlet opening to the lower portion thereof, and an upwardly directed air discharge opening, a radiator of relatively light construction extending lengthwise of said housing below said discharge opening and supported between the end walls thereof, said radiator having a multitude of air passages therethrough for the passage of air to be heated, and forming with an adjacent wall of said housing a free air passage, and a damper for controlling the volume of air passing through said radiator.

2. In a heating and ventilating unit, the combination of a housing having an air inlet near its bottom, and an outlet opening at the top thereof, a fan mounted in said housing adjacent said inlet opening, a radiator extending lengthwise of said housing and spaced from one of the adjacent vertical walls thereof to form a vertical passage to said outlet, said radiator having a plurality of passages therethrough also directed to be swung across the outlet side of said radiator passages.

3. In a heating and ventilating unit, the combination of a housing having an air inlet near its bottom and an outlet opening at the top thereof, a fan mounted in said housing adjacent said inlet opening, a radiator supported in the upper portion of said housing adjacent said outlet opening and having transverse air passages therethrough, said radiator forming with a parallel wall a passage to said outlet opening, and a damper hinged adjacent the lower portion of said radiator and adapted to direct a part or all of the air through said radiator or through said passage.

4. In a heating and ventilating unit, the combination with a building wall having an air duct therethrough, of a housing having an inlet opening registering with said air duct, and an air outlet opening, a fan and motor in said housing, and a support for said fan and motor engaging said building wall at said duct and acting to clamp said housing against said wall.

5. In a heating and ventilating unit, the combination of a housing having an air inlet opening near its bottom and an air outlet at its top, a radiator extending lengthwise of said housing, channel members rigidly mounted in said housing and supporting said radiator therebetween, pipes connected with said radiator, and means for reinforcing the radiator at the pipe connections.

6. In a heating and ventilating unit, the combination of a housing having an air inlet opening near its bottom and an air outlet at its top, a radiator and channel members mounted in the upper portion of said housing in vertically spaced relation, and supporting said radiator therebetween, pipe connections to said headers, and a plate fixed to the housing wall through which said pipe connections extend.

7. In a heating and ventilating unit, the combination of a portable housing adapted to be located in the room to be heated or ventilated, and against a side wall thereof, a heater supported within said housing and by the walls thereof, a motor driven fan enclosed by said housing and a supporting fixture anchored to said side wall and supporting said fan and housing thereupon independently of each other.

8. In a heating and ventilating unit, the combination of a portable housing adapted to be located in the room to be heated or ventilated, and against a side wall thereof, a heater supported within said housing and by the walls thereof, a fan unit including motor and fan enclosed by said housing, and a supporting fixture anchored in the side wall and supporting said fan unit and housing clear of the floor of said room, and independently of each other.

9. In a heating and ventilating unit, the combination with a relatively light housing adapted to be located against the side wall of the room to be heated or ventilated and having an air inlet adapted to register with an air duct in said wall, and having an air outlet; a heating element of relatively light construction supported by the walls of said housing; and a fan unit including a motor and fan enclosed within said housing and having means extending exteriorly of said housing by which said fan unit is supported independently of said housing.

10. In a heating and ventilating unit, the combination with a plurality of walls defining a closed housing, said housing being adapted to be located against the side wall of the room to be heated or ventilated and having an air inlet near its bottom adapted to register with an air duct in said wall, and an air outlet at its top; a heating element supported within said housing; and a fan unit including a motor and fan enclosed within said housing and having means bearing against the side wall of the room to support the fan unit independently of the various walls defining said housing.

11. In a heating and ventilating unit, the combination with a portable housing having top, bottom and side walls, and having an air inlet and an air outlet; a heating element mounted in said housing; a fan unit including a motor and fan mounted in said housing and having means fixed exteriorly of said housing and independently thereof for supporting said fan unit clear of the various walls of said housing.

12. In a heating and ventilating unit, the combination with a housing adapted to be mounted in a room to be heated and ventilated, said housing having an inlet opening near its bottom and an outlet opening near its top; a heater mounted in said housing adjacent to said outlet opening and supported by the walls thereof, there being a by-pass connecting said outlet with the space below the heater; a fan unit enclosed within said housing below said heater and supported independently of the walls of said housing; and a single damper mounted in said by-pass for controlling the volume of air passing through both the heater and the by-pass.

13. In a heating and ventilating unit, the combination with a housing having an inlet opening at its bottom and an outlet near its top; a heating element mounted in the upper portion of said housing and below said outlet opening, said heating element being provided with horizontally extending passages, and means defining a vertical free air passage adjacent to said heater and connecting the spaces above and below said heater, the passages in said heater being disposed to discharge into said free air passage; a damper mounted in said free air passage and operative to control the volume of air passing through both the heater and said free air passage; and a fan mounted in the space below said heater and adapted to draw air through the inlet opening in the housing and impel it upwardly through said heater and free air passage to said outlet opening.

14. In a heating and ventilating unit, the combination with a housing having an inlet opening at its bottom and an outlet opening near its top; a heating element mounted in the upper portion of said housing and below said outlet opening, said heating element being provided with passages therethrough, and means defining a free air passage adjacent to said heater and connecting the spaces above and below said heater, the passages in said heater being disposed to discharge into said free air passage; a damper mounted in said free air passage and operative to control the volume of air passing through both the heater and said free air passage; a fan mounted in the space below said heater and adapted to draw air through the inlet opening of the housing and impel it upwardly through said heater and free air passage to said outlet opening, said fan being supported for operation independently of said housing.

15. In a heating and ventilating unit, the combination with a housing adapted to be mounted in a room to be heated and ventilated, said housing having an inlet opening near its bottom and an outlet opening near its top; a heater mounted in said housing adjacent said outlet opening and supported by the walls thereof, there being a substantially vertical by-pass connecting said outlet with the space below the heater, said heater having transversely extending passages discharging into said by-pass; a motor-driven fan enclosed within the housing below said heater; and a single damper mounted in said by-pass for controlling the volume of air passing through both the heater and the by-pass.

16. In a heating and ventilating unit, the combination with a vertically disposed wall, of a housing, said housing having an inlet and an outlet, and a heating element supported by the walls thereof; a fan unit including a motor and fan enclosed within said housing; and means secured to said wall and extending into said housing to support said fan unit, said means serving also to suspend said housing on said wall.

17. In a heating and ventilating unit, the combination of a portable housing having an air inlet opening to the lower portion thereof and an upwardly directed air discharge opening, a radiator of relatively light construction extending lengthwise of said housing below said discharge opening and supported between the end walls thereof, said radiator having a multitude of air passages therethrough for the passage of air to be heated, the radiator being spaced from an adjacent wall of said housing to afford a by-pass for air, a damper for controlling the proportionate volume of air passing through said radiator and through said by-pass, and a fan located within the housing near the base of said unit and below the radiator.

18. In a heating and ventilating unit, the combination of a portable housing having an air inlet opening to the lower portion thereof and an upwardly directed air discharge opening, a radiator of relatively light construction extending lengthwise of said housing below said discharge opening and supported between the end walls thereof, said radiator having a multitude of air passages therethrough for the passage of air to be heated, the radiator being disposed parallel to the front and rear walls of said housing and spaced from one of said walls to afford a by-pass for air, a damper for controlling the proportionate volume of air passing through said radiator and said by-pass, and a fan located within the housing near the base of said unit and below the radiator.

19. A heating and ventilating unit comprising a casing divided into a blower chamber, fresh air inlet chamber, heating chamber, and discharge chamber, the inlet and blower chambers being one behind the other at the bottom of the casing, and the discharge chamber being at the top of the casing; and means for controlling the passage of air from the blower chamber through the heating chamber.

20. A heating and ventilating unit comprising a casing having a blower chamber and an inlet chamber both at its bottom; a heating chamber located above the blower chamber; a discharge chamber at the top of the casing with an opening for the discharge of air into the room of service; and a deflector within the casing between the heater and the discharge opening for shunting the heated air through said opening.

21. A heating and ventilating unit, comprising a casing divided into a blower chamber, fresh air inlet chamber, heating chamber, and discharge chamber, the inlet and blower chambers being one behind the other at the bottom of the casing, and the discharge chamber being at the top of the casing, and a relatively light weight radiator located in the heating chamber and having a heating capacity large in proportion to its dimensions as compared with a cast iron radiator.

22. A heating and ventilating unit, comprising a casing divided into a blower chamber, fresh air inlet chamber, heating chamber, and discharge chamber, the inlet and blower chambers being one behind the other at the bottom of the casing, a relatively light weight radiator located in the heating chamber and having a heating capacity large in proportion to its dimensions as compared with a cast iron radiator, and means for controlling the temperature of the air discharged from the discharge chamber.

23. A heating and ventilating unit, comprising a casing having within its bottom portion a blower chamber and a fresh air inlet; a heating chamber and a by-pass chamber, both above said blower chamber; an upwardly opening discharge outlet at the top of the casing; a single shiftable damper located between the heating and by-pass chambers to control the passage of air from the blower chamber to the discharge chamber; and means for shifting the damper so as to direct the air through either the heating or by-pass chamber, or partly through both of said chambers.

24. A heating and ventilating unit, comprising a casing having a blower chamber within its bottom portion, a discharge chamber at its top, and a heating chamber and a by-pass chamber between the discharge and bottom chambers and both communicating with the discharge chamber; a mixing damper located at the entrance to the by-pass chamber, and means for shifting the mixing damper so as to control the passage of air from the blower chamber through the heating and by-pass chambers to the discharge chamber.

25. A heating and ventilating unit, comprising a casing having a blower chamber within its bottom portion; a heating chamber above the blower chamber; a by-pass chamber beside the heating chamber and an outlet positioned to discharge both from the heating chamber and the by-pass chamber, and a mixing damper located at the entrance to the by-pass chamber and adjacent to the heating chamber, and means for actuating the mixing damper whereby to control the passage of air from the blower chamber through the heating and by-pass chambers.

26. A portable heating and ventilating unit, comprising a comparatively low and relatively shallow sheet-metal housing in cabinet form adapted to be positioned in the individual room to be serviced and having spaced front and rear walls, said housing having an air inlet opening through one of said walls, an air discharge outlet to the room, and a chamber adapted to receive a fan, a light weight fragile radiator of horizontally elongated dimensions extending parallel with said front and rear walls within the housing, and having a large heating surface in proportion to its dimensions, and means anchoring said radiator within said cabinet against the application of rupturing strains to said radiator by pipe connections thereto.

27. In a portable heating and ventilating unit, the combination of a comparatively low and relatively shallow sheet-metal housing in cabinet form adapted to be positioned in the individual room to be serviced, and having spaced front and rear walls, said housing having an air inlet opening through one of said walls, an upwardly directed air discharge outlet to the room, and a chamber adapted to receive a fan, a light weight radiator of horizontally elongated dimensions extending parallel with said front and rear walls within the housing, and having a large heating surface in proportion to its dimensions, and means for controlling the temperature of the air discharged through said discharge outlet.

28. A portable self-contained heating and ventilating unit, comprising a housing in cabinet form having sheet metal exterior walls and adapted to be located in the room to be serviced, a relatively light weight radiator in the housing, means for mounting and anchoring the radiator from the exterior walls of said housing to render the cabinet and radiator portable as a unit, the housing being provided with an inlet port below the radiator and a discharge port above the radiator, and having a fan chamber, and a fan within said chamber adapted to maintain an upwardly flowing current of air from the inlet port through the housing and from said discharge port.

29. The combination of a housing having a blower chamber and an inlet chamber within its bottom portion, and having an upwardly directed discharge outlet at its top, a horizontally elongated radiator having a large heating surface in proportion to its dimensions extending between the side walls of the housing and spaced from one wall to provide in said housing heating and by-pass chambers disposed in substantially parallel relation to the horizontal longitudinal axis of the radiator, and a blower in said blower chamber beneath the heating and by-pass chambers.

30. A self-contained heating and ventilating unit, comprising in combination a substantially rectangular housing having an upwardly directed air discharge opening in its top and having an air inlet near its bottom, a motor driven fan unit positioned in said housing adjacent to said inlet, said housing having above said fan a heating chamber and a by-pass chamber, each having its major horizontal dimension in parallelism with the front and rear walls of the housing, a horizontally disposed elongated but relatively low and shallow radiator of large heating capacity in proportion to its dimensions supported from the walls of the housing within said heating chamber, and a damper controlling the passage of air through said heating chamber and said by-pass chamber.

31. A self-contained heating and ventilating unit, comprising in combination a substantially rectangular housing having an upwardly directed air discharge opening in its top and having an air inlet near its bottom, a motor driven fan unit positioned in said housing adjacent to said inlet, said housing having above said fan a heating chamber and a by-pass chamber, each having its major horizontal dimension in parallelism with the front and rear walls of the housing, a horizontally disposed elongated but relatively low and shallow radiator of large heating capacity in proportion to its dimensions supported from the walls of the housing within said heating chamber, and a damper hinged adjacent to the inlet to the by-pass and adapted to be adjusted to proportionately regulate the flow of air through said heating chamber and by-pass.

32. A unitary structure of the character described, comprising a sheet-metal cabinet having an air inlet and an air outlet in its walls, in combination with a relatively fragile radiator, relatively light in weight and of relatively small dimensions in proportion to its air heating capacity, positioned in said cabinet and having means for making pipe connections thereto, and means within and co-operating with said cabinet and engaging said radiator to anchor the radiator against the application of rupturing strains to said radiator by pipe connections thereto.

33. A self-contained heating and ventilating unit comprising a sheet metal cabinet having an air inlet and an air outlet in its walls, a relatively fragile radiator, relatively light in weight and of relatively small dimensions in proportion to its air heating capacity, positioned in said cabinet and having means for making pipe connections thereto, and means connecting the radiator and cabinet to support and anchor said radiator against the application of rupturing strains to said radiator by pipe connections thereto.

34. A self-contained heating and ventilating unit comprising a sheet metal cabinet having an air inlet and an air outlet in its walls, and a relatively fragile radiator, relatively light in weight, and of relatively small dimensions in proportion to its heating capacity, said radiator and cabinet being constructed and arranged to anchor said radiator relative to said cabinet, whereby said radiator is braced and held against the application of rupturing strains to said radiator by pipe connections thereto.

WILFRED SHURTLEFF.